J. BURT.
TURRET TOOL HOLDER FOR LATHES.
APPLICATION FILED JUNE 29, 1909.
936,301.
Patented Oct. 12, 1909.
2 SHEETS—SHEET 2.
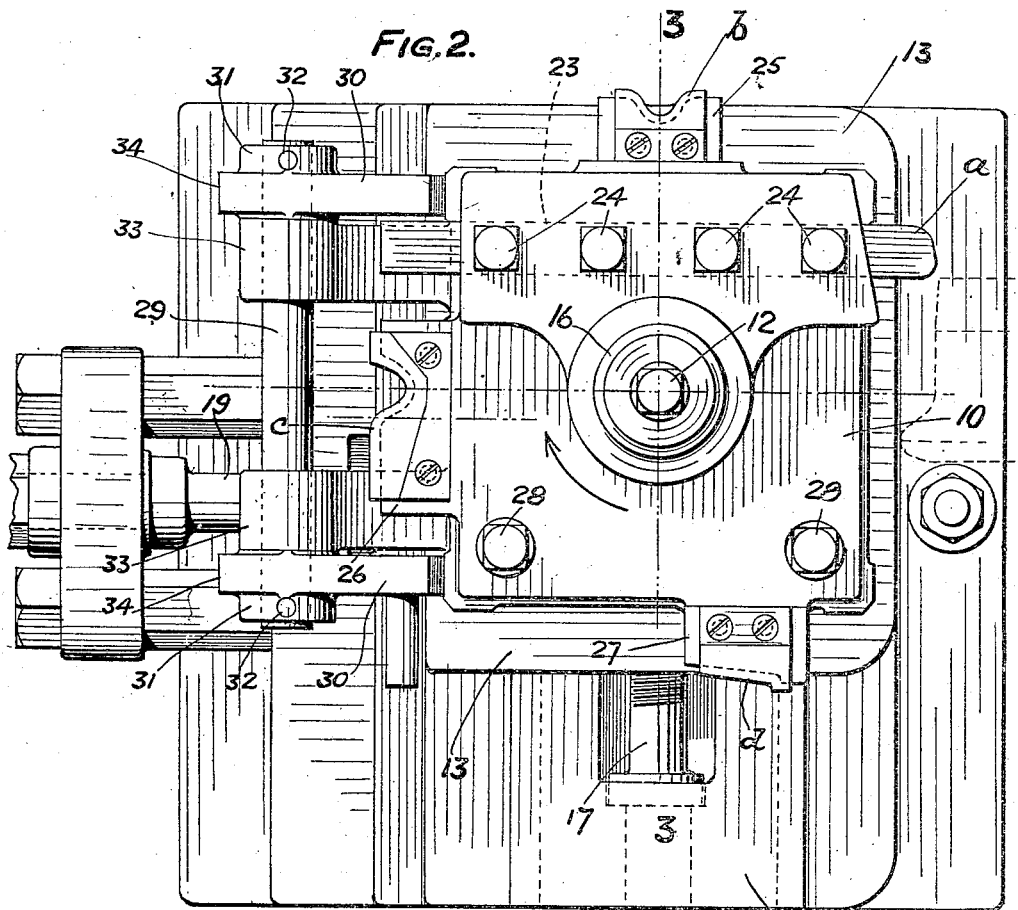
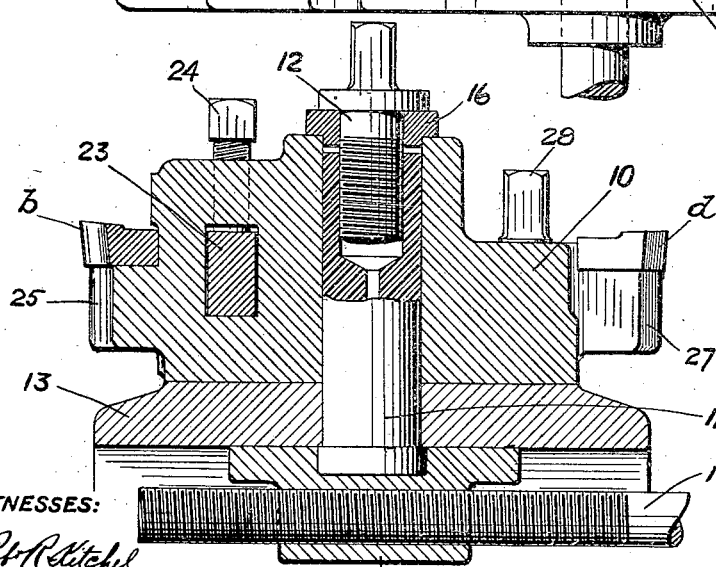
WITNESSES:
Rob R Kitchel
E. E. Wall
INVENTOR
John Burt
BY Harding & Harding
ATTORNEYS.

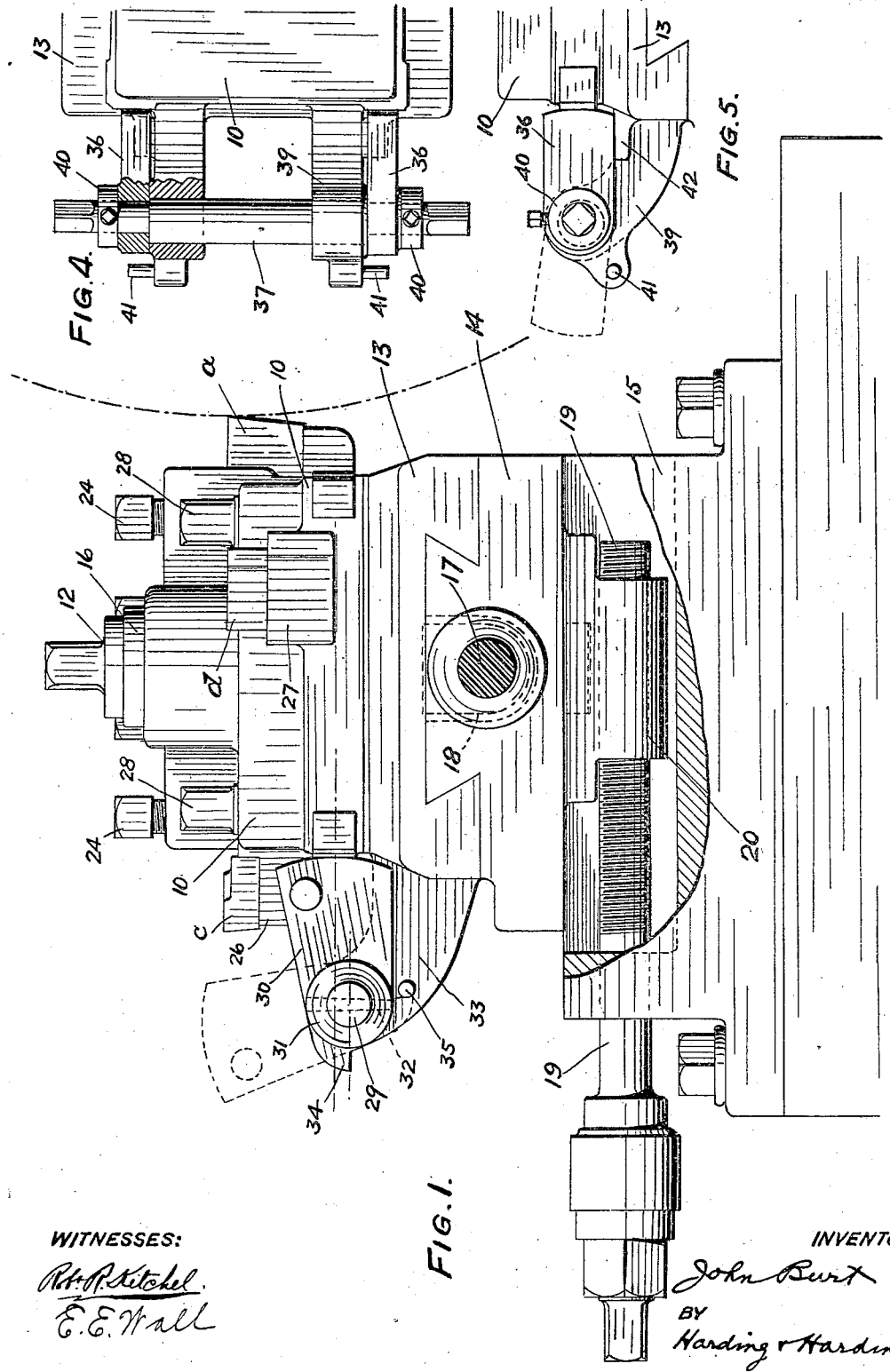

UNITED STATES PATENT OFFICE.

JOHN BURT, OF NARBERTH, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

TURRET TOOL-HOLDER FOR LATHES.

936,301.   Specification of Letters Patent.   Patented Oct. 12, 1909.

Application filed June 29, 1909. Serial No. 504,984.

*To all whom it may concern:*

Be it known that I, JOHN BURT, a citizen of the United States, residing at Narberth, county of Montgomery and State of Pennsylvania, have invented a new and useful Improvement in Turret Tool-Holders for Lathes, of which the following is a full, clear, and exact description, reference being had to the accompanying drawings, which form a part of this specification.

The objects of my invention are to so construct the revolving tool holder of a turret lathe that the several turning operations may be performed with maximum facility and expedition.

To this end the invention comprises: first, means for arranging the tools, adapted to successively act upon the work, upon the turret in such manner that they may each, after being swung from one operative position to another, be brought into position to properly act upon the work with a minimum of adjustment laterally or in a direction parallel to the axis of rotation of the work; and second, means capable of being instantly applied or released, to automatically accurately position the tool holder and lock the tool holder fixedly in position during the turning operation.

In the drawings: Figure 1 is a side elevation, partly broken away, of a part of a lathe embodying my invention. Fig. 2 is a plan view of the same. Fig. 3 is a partial section on the line 3—3 of Fig. 2. Fig. 4 is a plan view of a modified form of positioning and locking device. Fig. 5 is an end view of the same.

10 is the turret tool holder rotatable about a post 11 projecting upwardly from a slide 13 and adapted to be held in fixed relation to the post and slide by means of a center screw 12 and a washer 16 confined between the head of the screw and the upper face of the turret. The slide 13 is movable, in a direction parallel to the axis of rotation of the work, on a slide 14, and such movement is imparted to the slide 13 by means of a screw 17 that engages a nut 18 depending from the slide 13. The slide 14 is in turn movable, on a base 15, toward and from the work, and such movement is imparted to the slide 14 by means of a screw 19 that engages a nut 20 depending from the slide 14. The base 15 is also movable on its bed to enable the lathe to be adjusted for different diameters of work. The details of construction of the compound slide and its base and the means for actuating the slides need not be described as the same form no part of the present invention.

In the operation of turning a car wheel, to which the turret embodying my present invention is especially applicable, the tread and flange are first roughed off, then the flange is rough turned, then the flange and the main part of the tread is finished and then the remaining or tapered part of the flange and the corner on the outer face of the rim are finished. The turret 10 is provided with four tools adapted to perform respectively the successive operations enumerated, said tools being numbered $a$, $b$, $c$ and $d$. The first roughing tool $a$ is held in a pocket 23 extending through the turret in a direction perpendicular to the side from which it projects and is held in position by means of set screws 24. The tools $b$, $c$ and $d$ are of relatively small size and are simply bolted respectively to projections 25, 26 and 27 extending respectively from the remaining three sides of the turret. The mode of securing the tools in position is not material, so far as concerns the present invention; but the arrangement of the same is a part of my present invention and is such as to effect a substantial saving of time over arrangements hitherto in use, as it reduces to a minimum the time required in moving the tools in the direction of the axis of rotation of the wheel being turned, before the several turning operations. This is effected by locating the longitudinal centers of the several tools $b$, $c$, and $d$ at distances progressively increasing from the forward ends of the sides on which they are respectively mounted. As shown, the tool $b$ is located so that its center lies in a line perpendicular to the corresponding side of the turret and intersecting the axis of the turret, the tool $c$ is located so that its center lies back of such line with reference to the direction in which the tool approaches the work as the turret moves it into position, while the tool $d$ is located so that it lies still farther behind said line and comparatively close to the corner of the turret. With this arrangement, while it is necessary to move the turret laterally after the tool $b$ is swung into position, no such adjustment is necessary after the turret is swung to bring tool c into position, and a comparatively small movement is required to be imparted to the turret after the turret is given its last swing to bring tool d into action.

28, 28, are two projections on the top of the turret, which are squared to accommodate a wrench. To turn the turret, the operator drops a wrench on one of the projections and uses it as a handle to twist the turret about.

It is necessary to hold the turret firmly in the position into which it is brought for each operation. This is effected by means of a locking device preferably constructed as follows: Extending along the side of the turret opposite to that next to the work, is mounted a shaft 29. 30, 30, are cams, each having a hub 31 surrounding the shaft 29 and secured thereto by means of a tapered pin 32. The shaft 29 turns freely in bearings on brackets 33 secured to the slide 13. The working face of each cam is curved on an arc described upon a center located about one half inch above the axis of the shaft 29. The cams are adapted to respectively engage surfaces on the turret 10, along each side thereof, adjacent to its corners. The point of contact between the turret and the working face of each of the cams is above the axis of the shaft 29 and on the same horizontal plane as said center.

It will be understood that it is not essential that the working faces of the cams 30 should be curved as described, and they need not even be eccentric to the axis of the shaft, as they might be concentric therewith and still preserve their locking function. By making the cam faces eccentric, however, provision is made for a constantly increasing radius, which will take up any small amount of wear or lost motion by gravity and enable the cams to have a wedge action in moving into locking position.

The cams 30, when released, are, with the shaft 29, swung up into the position shown in dotted lines, Fig. 1; and are prevented from going beyond that point by a projection 34 on each cam contacting with a pin 35 on the corresponding bracket 33. After the center screw 12 is unlocked, the turret is free to be moved into its next operative position. The cams 30 and shaft 29 are now swung around and dropped against the pair of pins 35 on the corresponding side of the turret, and the center screw is again tightened. By the provision of a pair of cams, spaced apart, secured to a common shaft, the turret is automatically brought into the exact position required; that is, the side opposite to that engaged by the cams and carrying the tool for the next operation is brought into exact working position. In the specific turret shown, which has four working faces, it is insured that the turret shall be turned exactly ninety degrees in moving between successive operative positions. The provision of a pair of cams also insures that the turret will be held with stability in each of its operative positions.

It is not essential that the locking device shall be of the specific construction shown in Figs. 1 and 2. For example, a modification of the preferred locking device is shown in Figs. 4 and 5, in which is shown a two-member locking device, each of said members comprising a swinging lock or abutment 36 sleeved on a shaft 37, which is eccentrically mounted in brackets 39 supported, like bracket 33, on the slide 13. The abutments are held from sliding longitudinally on the shaft by means of collars 40. To operate this locking device, the abutments 36 are turned from the dotted line position, where they rest on pins or stops 41, to the full-line position, where they rest on projections 42 on the slide 13. Then the shaft 38 is turned, thereby forcing the abutments 36 directly against the turret. To unlock the turret, the shaft 38 is first turned to withdraw the abutments and then the latter are swung around to the clearing position shown in dotted lines. Both of these locking devices have certain important features in common that contribute to the performance of the double function of automatically centering or alining the turret, that is, bringing it into exact working position, and of locking the turret in such position. Each locking device engages the face of the turret on opposite sides of its center of rotation and engages the face near the edges thereof respectively adjoining adjacent turret faces. Each locking device is composed of a plurality of members spaced apart and engaging the turret face as described. Each locking device is adapted to engage a turret having perfectly plain or flat surfaces as distinguished from faces provided with recesses adapted to be engaged by a locking bolt.

It will be understood that while the division of the locking device into two members spaced apart is of substantial advantage, the invention, in its broadest aspect, is not limited to this feature, so long as the locking device engages the turret on opposite sides of its center of rotation at substantial distances from a plane drawn through the axis of rotation perpendicular to the contacting face of the turret.

The operation of the machine may be briefly described as follows: The work is centered between the face plates of the lathe. The turret is moved into position to bring the tool a opposite the outside corner of the wheel. The slide 13 is then moved inwardly until the tool contacts with, and then embeds itself into the revolving wheel, and at the same time the slide 14 is fed laterally, thereby rough-turning the tread from the outer face of the wheel to the flange. The slide 13 is then retracted until the tool $a$ is in position to operate upon the flange of the wheel, which is rough-turned in the same manner as the tread. The slide 13 is then retracted to permit the turret to be swung so that its corner will clear the wheel. Before swinging the turret, the cams 30 are lifted out of engagement and dropped into their idle position, and after the center screw 12 is released, the turret is swung around to bring tool $b$ into position, the clamps are lifted and dropped into their locking position. The center screw 12 is then tightened. The slide 13 is then advanced and the slide 14 moved laterally until the tool $b$ is properly positioned for work and the wheel is rotated until the rough-turning of the flange is completed. The operations by which the tools $c$ and $d$ are successively positioned for operation are the same as described for tool $b$ except that no lateral movement is required in adjusting tool $c$ and little lateral movement is necessary in adjusting tool $d$, due to the arrangement or positioning of the tools on the turret, as hereinbefore described.

By reason of the fact that the amount of lateral adjustment of the turret is reduced to a minimum, and that the turret can be accurately positioned and clamped between successive operations of the tools by simply moving the locking device into and out of locking position and releasing and tightening the screw 12, a great saving of time is effected. At the same time, provision is made for securely holding the turret in its several positions.

Having now fully described my invention, what I claim and desire to protect by Letters Patent is:

1. In a lathe, the combination with a rotatable turret tool holder having a plurality of faces, of a locking device adapted to engage said faces at points in proximity to the opposite edges thereof respectively adjoining the two adjacent faces, thereby locking the tool holder from turning and automatically alining the same in proper relation to the work.

2. In a lathe, the combination with a rotatable turret tool holder having a plurality of faces, of a locking device composed of a plurality of members spaced apart and adapted to engage either of said faces on opposite sides of the center of rotation of said tool holder, thereby alining the tool holder in proper relation to the work and locking the same in position.

3. In a lathe, the combination with a rotatable turret tool holder having a plurality of faces, of a locking device composed of a plurality of members spaced apart and adapted to engage either of said faces at points in proximity to the opposite edges thereof respectively adjoining the two adjacent faces.

4. In a lathe, the combination with a rotatable turret tool holder having a plurality of faces, of a locking device adapted to be moved from and toward either of said faces and engage an unrecessed part of the same and thereby lock the tool holder from turning.

5. In a lathe, the combination with a rotatable turret tool holder having a plurality of faces, of a locking device adapted to be moved from and toward either of said faces and engage an unrecessed part of the same on opposite sides of its center of rotation.

6. In a lathe, the combination with a rotatable turret tool holder having a plurality of faces, of a locking device comprising a plurality of members spaced apart and adapted to be moved from or toward either of said faces and engage an unrecessed part of the same on opposite sides of its center of rotation.

7. In a lathe, the combination with a rotatable turret tool holder having a plurality of uprights faces, of a locking device comprising a plurality of members swinging on a common axis and adapted to be moved toward or from either of said faces and engage parts thereof in the same vertical plane.

8. In a lathe, the combination with a rotatable turret tool holder, of swinging locking members spaced apart and located alongside of, and adapted to be swung toward and from, the tool-holder.

9. In a lathe, the combination with a rotatable turret tool holder, of swinging cams spaced apart, located alongside the same, and adapted to be swung into contact therewith, each of said cams having a curved contacting face.

10. In a lathe, the combination with a rotatable turret tool holder, of a shaft located alongside the same, and cams fixed to the shaft and spaced apart thereon and adapted by the turning of the shaft, to be swung and wedged against the tool holder to lock the same from rotation.

11. In a lathe, the combination with a rotatable turret tool holder, of a shaft located alongside the same, and cams fixed to the shaft and spaced apart thereon and adapted to be swung against the tool holder, each of said cams having a contacting face curved on a line which gradually approaches the axis of the shaft in the direction in which it is moved to lock.

12. In a lathe, the combination with a rotatable turret tool holder, of a shaft located alongside the same, cams fixed to, and spaced apart on, said shaft and adapted to be turned with said shaft and wedged against the tool holder, a slide on which the turret is mounted, a bracket thereon having bearings in which said shaft turns, and a stop adapted to limit the turning movement of said cams and shaft when the same are swung away from locking position.

13. In a lathe, the combination, of a rotatable turret tool holder, of a swinging cam adapted to contact with said tool holder at such a point that the line of pressure of the tool holder intersecting said point extends to one side of the axis on which the cam swings.

14. In a lathe, the combination with a rotatable turret tool holder presenting a flat cam-engaging face, of a cam adapted to swing downwardly and contact with such flat face, the arrangement being such that a line extending through the point of contact between the cam and tool holder and perpendicular to said flat face extends to one side of the axis on which cam swings.

15. In a lathe, the combination with a rotatable turret tool-holder, of a pair of cams adapted to swing downwardly and lock said tool-holder, the working face of each cam being curved on an arc described upon a center located to one side of the axis on which it swings.

16. In a lathe, the combination with a rotatable turret tool holder having cam-contacting vertical faces thereon, of a pair of cams adapted to swing into contact therewith and having working faces curved eccentrically to the axis upon which said cams swing, said axis being located at a level different from that of the cam-contacting parts of said faces.

17. In a lathe, the combination with a rotatable turret tool holder, of tools arranged on the respective sides of the tool-holder and adapted to act successively upon the work, a plurality of said tools being arranged at distances from the front edges of the sides of the tool holder successively increasing from the first tool holder to the last.

18. In a lathe, the combination with a rotatable tool holder, of tools arranged on the respective sides of the tool holder and adapted to act successively upon the work, two or more of said tools being arranged with the corresponding parts of their working faces at substantially equal distances from lines intersecting the axis of the tool holder and perpendicular to the longitudinal extensions of said tools.

In testimony of which invention, I have hereunto set my hand, at Philadelphia, on this 23rd day of June, 1909.

JOHN BURT.

Witnesses:
WARREN R. CHURCH,
HELEN FAHNESTOCK.